United States Patent
Morikawa et al.

(10) Patent No.: US 8,450,228 B2
(45) Date of Patent: May 28, 2013

(54) REFRACTORY, METHOD FOR MANUFACTURING REFRACTORY, AND REFRACTORY RAW MATERIAL

(75) Inventors: Katsumi Morikawa, Kitakyushu (JP); Koichi Haren, Kitakyushu (JP); Joki Yoshitomi, Kitakyushu (JP); Toshiyuki Hokii, Kitakyushi (JP); Keisuke Asano, Kitakyushu (JP)

(73) Assignee: Krosaki Harima Corporation, Kitakyushu-shi (JP)

( * ) Notice: Subject to any disclaimer, the term of this patent is extended or adjusted under 35 U.S.C. 154(b) by 1108 days.

(21) Appl. No.: 11/887,744

(22) PCT Filed: Apr. 19, 2006

(86) PCT No.: PCT/JP2006/308244
§ 371 (c)(1),
(2), (4) Date: Oct. 3, 2007

(87) PCT Pub. No.: WO2006/112485
PCT Pub. Date: Oct. 26, 2006

(65) Prior Publication Data
US 2009/0075808 A1 Mar. 19, 2009

(30) Foreign Application Priority Data
Apr. 19, 2005 (JP) .................... 2005-121363

(51) Int. Cl.
*C04B 35/80* (2006.01)
*C04B 35/81* (2006.01)
*C04B 35/52* (2006.01)

(52) U.S. Cl.
USPC ............. 501/100; 501/99; 501/101; 501/109; 501/110; 501/95.2; 501/95.3

(58) Field of Classification Search
USPC ................. 501/95.1, 95.2, 99–101, 109, 110, 501/95.3; 423/447.1, 447.2, 447.4, 447.5, 423/447.7
See application file for complete search history.

(56) References Cited

U.S. PATENT DOCUMENTS

| 4,663,230 A | * | 5/1987 | Tennent ..................... 428/367 |
| 6,846,766 B1 | * | 1/2005 | Daldrup et al. ................ 501/99 |

(Continued)

FOREIGN PATENT DOCUMENTS

| EP | 1375430 | 1/2004 |
| JP | 54-163913 | 12/1979 |

(Continued)

OTHER PUBLICATIONS

Yahachi Saito and Shunji Bandow, "Ka-bon Nanochu-bu no Kiso (Introduction to Carbon Nanotubes)", First Edition, Corona Publishing Co., Ltd., Nov. 13, 1998, pp. 23-57.

(Continued)

*Primary Examiner* — Karl Group
(74) *Attorney, Agent, or Firm* — Edwards Wildman Palmer LLP

(57) ABSTRACT

In a carbon-containing refractory composed of a refractory aggregate, a carbon based raw material, and a carbon bond connecting between the refractory aggregate or the carbon based raw material, transition metal-containing nanoparticles having particle diameters of 1,000 nm or less and containing a transition metal are contained in the above-described carbon bond while being dispersed. When the carbon-containing refractory is heat-treated, flexible structures of carbon fiber-shaped textures having diameters of 50 nm or less are formed in the inside of a carbon bond and, thereby, an increase in strength, a reduction in modulus of elasticity, and a reduction in thermal expansion coefficient are facilitated. Therefore, a carbon-containing refractory exhibiting high thermal shock resistance, high abrasion resistance, and high corrosion resistance are provided.

3 Claims, 3 Drawing Sheets

U.S. PATENT DOCUMENTS

| | | |
|---|---|---|
| 2004/0106509 A1 | 6/2004 | Ochiai et al. |
| 2004/0126306 A1 | 7/2004 | Ochiai et al. |

FOREIGN PATENT DOCUMENTS

| | | |
|---|---|---|
| JP | 62-9553 | 7/1981 |
| JP | 01-320262 | 12/1989 |
| JP | 03-090271 | 4/1991 |
| JP | 05-078180 | 3/1993 |
| JP | 06-064961 | 3/1994 |
| JP | 2002-265210 | 9/2002 |
| JP | 2002-265211 | 9/2002 |
| JP | 2002-293524 | 10/2002 |
| JP | 2002-316865 | 10/2002 |
| JP | 2004-067431 | 3/2004 |
| JP | 2005-089271 | 4/2005 |
| WO | WO-00/40509 | 7/2000 |
| WO | WO-02/072477 | 9/2002 |
| WO | WO-2004/025003 A2 | 3/2004 |

OTHER PUBLICATIONS

Office Action dated May 20, 2009, issued for Russian Patent Application No. 2007122623 and the English translation thereof.

Notice of Rejection mailed Jul. 21, 2010, issued for the Japanese Patent Application No. 2007-528178 and English translation thereof.

Hiroyuki Fuchimoto et al., "Application of Nano Technology to MgO-C Bricks," Refractories, vol. 56, No. 3, Mar. 1, 2004, p. 124.

* cited by examiner (a)            (b)

REFRACTORY, METHOD FOR MANUFACTURING REFRACTORY, AND REFRACTORY RAW MATERIAL

TECHNICAL FIELD

The present invention relates to a refractory having a carbon bond to be used in an iron making process, a steelmaking process, and the like.

BACKGROUND ART

The features of refractories, in which a carbonaceous bonding texture (carbon bond) is formed between particles of base materials, e.g., refractory inorganic oxide raw materials, such as alumina and magnesium, and carbon based raw materials, such as graphite, include that the wettability with slag is poor, the corrosion resistance is excellent, and the thermal shock resistance is also excellent because the thermal conductivity is high and the modulus of elasticity is low. In particular, these features are more pronounced when the refractory contains a carbon based raw material, e.g., graphite, as base material particles (hereafter referred to as "a carbon-containing refractory"). Therefore, the above-described refractories have been widely used as linings of hot metal transfer ladles and converters and refractories for continuous casting. Furthermore, in recent years, higher strength and higher thermal shock resistance have been required as the use condition of the refractory becomes severer.

With respect to the refractory, e.g., the above-described carbon-containing refractory, having a carbon bond, a technology for adding carbonaceous fibers to the material for the carbon-containing refractory has been developed as a method for improving the strength thereof (refer to Patent Documents 1 to 3). For example, Patent Document 1 discloses a magnesia carbonaceous brick in which carbonaceous fibers having outer diameters of 5 μm or less and lengths of 0.13 to 50 mm are mixed by dispersion. Patent Document 2 discloses that carbon fibers of 1 to 5 mm are added to a raw material formulation of a carbon-containing refractory. When carbonaceous fibers are added as described above, the carbonaceous fibers function as fillers and, thereby, the strength is increased and the corrosion resistance and the thermal shock resistance of the refractory can be improved. Patent Document 3 discloses carbon-containing refractory in which carbon fibers having outer diameters of 10 to 50 μm and lengths of 0.20 to 2 mm and a low-melting point active metal, e.g., Si or Al, are added to a refractory powder in order to improve poor affinity between the refractory material and the carbon fibers. According to this, in a heat treatment, the low-melting point active metal reacts with C and N in an atmosphere, protrusions composed of a non-oxidizing compound are formed on the surfaces of the carbon fibers and, thereby, the withdrawal resistance of the carbon fiber is increased and the joining effect is increased.

On the other hand, with respect to the carbon-containing refractory, the carbon component in the refractory is oxidized and eliminated during the use at high temperatures, decarburized portions become fragile, and dissolution loss and abrasion become remarkable. That is, a weak point of the carbon-containing refractory is the oxidation resistance at high temperatures, and there is a drawback in that the useful life is relatively short. Heretofore, for the purpose of improving the oxidation resistance, carbon-containing refractories, in which various oxidation resistance imparting agents have been added to the materials for carbon-containing refractories, have been developed.

For example, in Patent Document 4, metal powders, e.g., Al, B, Cr, Ti, and Mg, are used as the oxidation resistance imparting agents. According to this, an oxide of a metal powder is generated at high temperatures, gaps in the texture formed during molding are almost completely filled by volume expansion of the metal oxide so as to densify and, thereby, an increase in strength and a reduction in gas permeability are facilitated. Entrance of an oxidizing gas and slag into the texture is prevented by this densification and, in addition, the oxidation resistance is improved.

Patent Document 5 discloses that metal chromium or a chromium compound, e.g., chromium carbide or chromium boride, is added to a magnesia carbon brick. The metal chromium and the chromium compounds react with magnesia in a high temperature atmosphere so as to form $MgO\text{—}Cr_2O_3$ based high-melting point products. According to this, an apparent viscosity of the slag is increased, and elution of the magnesia aggregate into the slag is suppressed.

Patent Document 6 discloses a carbon-containing refractory formed by adding a metal alkoxide powder of Al, Ca, Mg, Zr, Si, Ti, Cr, or the like to graphite and a refractory raw material. The metal alkoxide decomposes at a high temperature of 300° C. or higher, and a part of alkoxide groups remain so as to strengthen the connection of a carbon bond. On the other hand, the metal portions react with CO, which is a main atmosphere in the inside of the refractory, so as to form metal carbides, and when nitrogen is contained, metal nitrides are formed. The texture is densified by volume expansion through formation of the metal carbides and the metal nitrides. Consequently, entrance of an oxidizing gas and slag into the texture is prevented and, in addition, the oxidation resistance is improved.

[Patent Document 1]
Japanese Examined Patent Application Publication No. 62-9553
[Patent Document 2]
Japanese Unexamined Patent Application Publication No. 3-90271
[Patent Document 3]
Japanese Unexamined Patent Application Publication No. 5-78180
[Patent Document 4]
Japanese Unexamined Patent Application Publication No. 54-163913
[Patent Document 5]
Japanese Unexamined Patent Application Publication No. 1-320262
[Patent Document 6]
Japanese Unexamined Patent Application Publication No. 6-64961
[Patent Document 7]
WO 00/40509
[Patent Document 8]
Japanese Unexamined Patent Application Publication No. 2002-293524
[Non-Patent Document 1]
Yahachi SAITO and Shunji BANDOW, "Ka-bon Nanochubu no Kiso (Introduction to Carbon Nanotubes)", First Edition, CORONA PUBLISHING CO., LTD., Nov. 13, 1998, pp. 23-57.

DISCLOSURE OF INVENTION

Problems to be Solved by the Invention

With respect to the above-described refractory in which carbonaceous fibers are mixed into the matrix, since the carbonaceous fibers function as fillers, excellent effects of improving the strength and improving the thermal shock resistance and the abrasion resistance are exhibited. However, when the carbonaceous fibers are mixed, dense filling of the matrix is hindered due to the fiber elasticity, and gaps tend to be formed in the refractory. Consequently, entrance of the oxidizing gas and the slag into the texture of the refractory tend to occur. That is, addition of large amounts of carbonaceous fibers is not preferable from the view point of the oxidation resistance, and the amount of addition is restricted. Therefore, the technique of improving the thermal shock resistance and the abrasion resistance by the addition of carbonaceous fibers has a limit.

On the other hand, according to the above-described technique of adding a metal powder serving as the oxidation resistance imparting agent to the refractory, excellent effects of improving the oxidation resistance of the carbon-containing refractory and improving the durability are exerted. However, since the metal powder has a large expansion coefficient at high temperatures and the moduli of elasticity of reaction products become high, it cannot be said that addition of large amounts of metal powder is very preferable, from the view point of the thermal shock resistance, the abrasion resistance, and the corrosion resistance.

Likewise, it cannot be said that addition of large amounts of non-oxidizing material, as shown in Patent Document 5, is very preferable, from the view point of the thermal shock resistance, the abrasion resistance, and the corrosion resistance because the thermal expansion coefficient and the modulus of elasticity are increased.

Accordingly, it is an object of the present invention to provide a refractory, which has a carbon bond and which can improve the thermal shock resistance, the abrasion resistance, and the corrosion resistance without degrading the oxidation resistance even when the carbon content is the same, a method for manufacturing the refractory, and a refractory raw material serving as the raw material for the refractory.

Means for Solving the Problems

A refractory according to an aspect of the present invention is a refractory, in which a carbon bond is disposed between base material particles, characterized in that carbon fiber-shaped textures having diameters of 50 nm or less are contained in the above-described carbon bond. (First aspect)

Furthermore, a refractory according to an aspect of the present invention is the refractory, in which a carbon bond is disposed between base material particles, of the first aspect, characterized in that fine particles having particle diameters of 1,000 nm or less and containing a transition metal or a transition metal salt (hereafter "a transition metal or a transition metal salt" is collectively referred to as "a transition metal or the like") are contained in the above-described carbon bond while being dispersed. (Second aspect)

A refractory according to an aspect of the present invention is the refractory of the first aspect, characterized in that fine particles having particle diameters of 1,000 nm or less and containing a metal catalyst or a metal salt catalyst (hereafter referred to as "a metal catalyst"), which facilitates formation of fine fibers from carbon, are contained in the above-described carbon bond while being dispersed. (Third aspect)

In the following description, "fine particles having particle diameters of 1,000 nm or less and containing a transition metal or the like" and "fine particles having particle diameters of 1,000 nm or less and containing a metal catalyst which facilitates formation of fine fibers from carbon" are generically called "metal-containing nanoparticles".

Here, a term "carbon bond" refers to a carbonaceous bonding texture which is formed between particles of refractory base material (refractory aggregate, carbon based raw material, and the like) and bonds them together. The carbon bond is formed by heat-treating an organic binder composed of any one of a phenol resin, tar, or pitch or a mixture thereof in an arbitrary combination. When fine particles of a transition metal or the like (or a metal catalyst) are dispersed in the inside of the carbon bond, the fine particles of the transition metal or the like (or the metal catalyst) facilitates formation of fine fibers from carbon in the carbon bond during the heat treatment.

At present, a hydrocarbon catalytic decomposition method, in which a hydrocarbon is reacted in a vapor phase at high temperatures in the presence of a catalyst and, thereby, a multilayer carbon nanotube is generated with a high degree of efficiency, is known as a method for synthesizing a very fine carbon fiber-shaped texture, e.g., a carbon nanotube. Furthermore, a method, in which an amorphous nanoscale carbon tube is produced by heat-treating a heat-decomposable resin and a metal based catalyst, is known (refer to Patent Documents 7 and 8 and Non-Patent Document 1).

These produce carbon nanotubes separately. It has been attempted to add the thus produced carbon nanotubes as a starting raw material to the refractory.

However, even when it is attempted to use such a carbon nanotube raw material by addition to the refractory, it is difficult to form fine carbon fiber-shaped textures uniformly between constituents of the refractory and the like in such a way that segregation does not occur. Furthermore, effects of improving the various properties of the refractory are not satisfactory.

An aspect of the present invention is characterized in that carbon fiber-shaped textures, which are fine to the extent necessary for solving the above-described problems, are formed while being dispersed in the refractory during preheating or steel receiving in the production process or use of the refractory.

In the heat treatment step of the refractory, narrow spaces between base material particles (spaces in which a carbon bond is to be formed) are in a gas atmosphere of CO, hydrocarbon, and the like because of decomposition or vaporization of organic volatile components contained in the organic binder. Therefore, it is believed that a reaction environment similar to the reaction environment in the method for synthesizing the carbon nanotubes is formed in fine spaces all over the carbon bond region between the base material particles. Furthermore, it is estimated that fine carbon fiber-shaped structure forms, such as carbon nanotubes and amorphous nanoscale carbon tubes having amorphous carbon tube walls, are formed in the carbon bond during the heat treatment through the catalysis and the like of metal-containing nanoparticles contained in the carbon bond while being dispersed. The resulting very fine carbon fiber-shaped textures and fine spaces formed simultaneously in the very fine carbon fiber-shaped textures bring about an increase in strength and a reduction in modulus of elasticity of the refractory having a carbon bond. In particular, remarkable improvement thereof can be observed with respect to the carbon-containing refractory containing the carbon based raw material.

The function of reducing the thermal expansion coefficient of the refractory is believed to be as described below. First, since very fine carbon fiber-shaped textures, such as carbon nanotubes, contain a high proportion of textures in which carbon atoms are regularly bonded to each other, the bonding strength between carbon atoms is larger than that of irregular textures, e.g., glassy carbon texture. Consequently, the thermal expansion coefficient of the carbon bond containing a high proportion of very fine carbon fiber-shaped textures becomes smaller as compared with that of a carbon bond composed of irregular textures, e.g., glassy carbon texture. Second, the very fine carbon fiber-shaped textures inevitably form fine spaces in the fiber-shaped textures at the same time with the formation thereof, the fiber-shaped textures are deformed flexibly by an external force due to thermal expansion of the refractory constituents, e.g., refractory aggregates, and in addition, the deformation is absorbed by fine spaces around the fiber-shaped textures, so that the thermal expansion coefficient of the carbon bond is reduced. As a result of them, the thermal expansion coefficient of the entire refractory is reduced.

The functions of increasing the strength and reducing the modulus of elasticity of the refractory are believed to be as described below. First, very fine carbon fiber-shaped textures, such as carbon nanotubes, are deformed flexibly against an external force and, in addition, perform function of widely distributing and relaxing the stress. Since a high proportion of very fine carbon fiber-shaped textures are present in the carbon bond while being dispersed, the functions are synergistically and widely performed. Second, the very fine carbon fiber-shaped textures inevitably form fine spaces in the fiber-shaped textures at the same time with the formation thereof, the fiber-shaped textures are deformed flexibly by an external force and, in addition, the deformation is absorbed by fine spaces around the fiber-shaped textures, so that the stress is relaxed. As a result of them, a stress concentration point, at which the breaking strength is exceeded, becomes hard to occur in the carbon bond, so that the breaking strength of the entire refractory is increased and, at the same time, the modulus of elasticity is reduced.

That is, metal-containing nanoparticles having particle diameters of 1,000 nm or less are contained in the carbon bond while being dispersed, and a heat treatment is performed. Consequently, very fine carbon fiber-shaped textures are formed all over the carbon bond region while being dispersed uniformly and, thereby, an increase in strength, a reduction in modulus of elasticity, and a reduction in thermal expansion coefficient of the refractory are facilitated. As a result, the thermal shock resistance (heat-spalling resistance) is improved.

If the particle diameter of the metal-containing nanoparticle becomes larger than 1,000 nm, the catalysis deteriorates, and very fine carbon fiber-shaped textures become hard to generate and tend to segregate in the carbon bond texture. As a result, the effects of increasing the strength, reducing the modulus of elasticity, and reducing the thermal expansion coefficient of the refractory are reduced, and a refractory having particularly high thermal shock resistance cannot be produced.

In the present invention, the diameters of the very fine carbon fiber-shaped textures, e.g., carbon nanotubes, formed in the carbon bond through the catalysis and the like of the metal-containing nanoparticles are about 20 to 50 nm. Such an extent of size of diameter is preferable in order to more effectively perform the above-described function. Therefore, it is preferable that the size of fine particles of the transition metal or the like (or a metal catalyst) is specified to be within the range close to the diameter of the very fine carbon fiber-shaped texture, that is, 100 nm or less, and more preferably is 20 to 50 nm. As described above, when the diameter is made smaller, the specific surface area can be increased, the reactivity as the catalyst can be increased, and more uniform dispersion over a wide range in the inside of the carbon bond can be facilitated. As a result, large amounts of carbon fiber-shaped textures can be formed uniformly over a wide range in the carbon bond.

The metal-containing nanoparticles having such small particle diameters have a large particle surface energy, and in general, handling in a single powder state is difficult.

An aspect of the present invention is characterized in that the metal solution is used as a starting raw material for a source of metal having the above-described suitable size of diameter, the metal solution being a solution of a transition metal, a transition metal salt, a metal catalyst, or a metal catalyst salt and being in a liquid state or a colloidal or suspension state, and deposited metal-containing nanoparticles having the above-described suitable size of diameter are contained in the inside of the carbon bond texture.

Therefore, in the refractory according to an aspect of the present invention, the particle diameters of metal particles present in the carbon bond are totally different from that of the known refractories, in which metal powders serving as oxidation resistance imparting agents or the like are added, or the above-described carbon nanotube synthesis method or the like, which is the known technology.

The term "metal catalyst" (the second third aspect) refers to a catalyst which facilitates formation of fine fibers, e.g., carbon nanotube, from carbon. Specifically, the metal catalyst refers to a metal of iron group, platinum group, rare earths, or the like, which has a capability of catalyzing the formation of carbon nanotube and the like, as described in Non-Patent Document 1.

The above-described refractory according to an aspect of the present invention (the first or the second aspect) includes refractory products in the case where the above-described heat treatment is not performed, that is, other forms of refractory products referred to as so-called light burned products and unburned products.

In this case, carbon fiber-shaped texture having a diameter of 50 nm or less may not be contained in the carbon bond of the refractory. However, since metal-containing nanoparticles having particle diameters of 1,000 nm or less are contained in the carbon bond while being dispersed, textures similar to those produced by the above-described heat treatment, that is, textures, in which carbon fiber-shaped textures having diameters of 50 nm or less are present in the carbon bond while being dispersed, can be produced by the heat received during preheating, steel receiving, or the like in the use.

In the above-described refractory according to an aspect of the present invention, the term "base material particles" refers to a base material to be used for a usual refractory, and the type thereof is not specifically limited. Therefore, the refractory aggregate, carbon based raw material, and the like can be used as the "base material particles". In particular, the feature of the present aspect is modification of the carbon bond, and it does not matter whether the "base material particles" contain the carbon based raw material.

The refractory according to an aspect of the present invention, containing carbon fiber-shaped textures having diameters of 50 nm or less in the carbon bond can be produced by heat-treating the above-described refractory containing the metal-containing nanoparticles in a dispersion state at about 600° C. to about 1,200° C.

Furthermore, a refractory according to an aspect of the present invention can have a configuration in which metal-containing nanoparticles deposited in the inside of the bond texture by mixing and heat-treating a starting material prepared by adding a metal solution to the above-described base material particles and an organic binder are contained in the above-described carbon bond, the metal solution being a solution of a transition metal or a transition metal salt and being in a liquid state or a colloidal or suspension state. (Fourth aspect)

A refractory according to an aspect of the present invention can have a configuration in which metal-containing nanoparticles deposited in the inside of the bond texture by mixing and heat-treating a starting material prepared by adding a metal solution to the above-described base material particles and an organic binder are contained in the above-described carbon bond, the metal solution being a solution of a metal catalyst facilitating formation of fine fibers from carbon and being in a liquid state or a colloidal or suspension state in which fine particles having particle diameters of 1,000 nm or less are dispersed in a solvent. (Fifth aspect)

When the organic binder is mixed with the solution of a transition metal or a transition metal salt in a liquid state or a colloidal or suspension state in which fine particles having particle diameters of 1,000 nm or less are dispersed in a solvent (or the solution of the metal catalyst facilitating formation of fine fibers from carbon), molecules, colloids, or very fine particles containing a transition metal or the like or a metal catalyst are dispersed and mixed into the organic binder nearly uniformly. The resulting mixture of the organic binder and the base material particles is heat-treated and, thereby, volatile components are vaporized and very fine metal-containing nanoparticles are deposited in the inside of carbon bond textures (and a carbon substrate, in the case where the base material includes the carbon substrate) while being dispersed. Subsequently, carbon fiber textures are formed by the catalysis and the like of these metal-containing nanoparticles and, thereby, an increase in strength, a reduction in modulus of elasticity, and a reduction in thermal expansion coefficient of the refractory are facilitated, as described above. Consequently, the thermal shock resistance can be improved almost without degrading the oxidation resistance and the corrosion resistance.

Furthermore, since an inclusion, such as the above-described carbon fibers serving as a raw material substance, which hinders dense filling of each base material when the starting raw material is mixed, is not contained, the porosity of the inside of the refractory is not increased. Consequently, the oxidation resistance and the like of the refractory are not degraded.

A refractory according to an aspect of the present invention can be configured to be produced by kneading and heat-treating a starting material containing the organic binder composed of any one of a phenol resin, tar, or pitch or a mixture thereof in an arbitrary combination, a metal solution, and base material particles, the metal solution being a solution of a transition metal or a transition metal salt and being in a liquid state or a colloidal or suspension state in which fine particles having particle diameters of 1,000 nm or less are dispersed in a solvent. (Sixth aspect)

A refractory according to an aspect of the present invention can be configured to be produced by kneading and heat-treating a starting material containing the organic binder composed of any one of a phenol resin, tar, or pitch or a mixture thereof in an arbitrary combination, a metal solution, and base material particles, the metal solution being a solution of a metal catalyst facilitating formation of fine fibers from carbon and being in a liquid state or a colloidal or suspension state in which fine particles having particle diameters of 1,000 nm or less are dispersed in a solvent. (Seventh aspect)

According to this, the transition metal or the transition metal salt (or the metal catalyst or the metal catalyst salt) in a liquid state or a colloidal or submicron particle state is nearly uniformly mixed by dispersion into the organic binder composed of any one of a phenol resin, tar, or pitch or a mixture thereof in an arbitrary combination. Subsequently, very fine carbon fiber-shaped textures are formed between base material particles in a carbon bond formed as carbon residue components of the phenol resin, tar, or pitch by a heat treatment through the catalysis of the metal mixed by dispersion. In this manner, an increase in strength, a reduction in modulus of elasticity, and a reduction in thermal expansion coefficient of the refractory are facilitated, as described above. Consequently, the thermal shock resistance (heat-spalling resistance) is improved almost without degrading the oxidation resistance and the corrosion resistance.

In an aspect of the present invention, the above-described metal solution can be a solution of an organic metal compound having the compatibility with the organic binder. (Eighth aspect)

According to this, the metal solution and the organic binder can be mixed uniformly while the dispersibility is further improved. Consequently, very fine carbon fiber-shaped textures can be formed over a wide range in a carbon bond while being dispersed and, therefore, an increase in strength, a reduction in modulus of elasticity, and a reduction in thermal expansion coefficient of the refractory are facilitated effectively.

Examples of solutions of organic metal compounds having the compatibility with the organic binder include organic acid salts of transition metals having the compatibility with thermosetting resins. Various organic transition metal compounds and the like having the compatibility with phenol resins can be used therefor. Examples of the compounds include transition metal carboxylic acid salts having the carbon number of 1 to 18, transition metal naphthenic acid salts having the carbon number of 1 to 25, alkyl transition metals having the carbon number of 1 to 10, transition metal β-diketonates having the carbon number of 1 to 10, transition metal dialkylamides having the carbon number of 1 to 20, and transition metal carbonyls.

Specific examples thereof include organic transition metal salts and the like formed from 2-ethylhexanoic acid (octylic acid), 2-ethylpentanoic acid, 2-ethylbutanoic acid, cyclopentanoic acid, cyclohexanoic acid, succinic acid, malonic acid, fumaric acid, maleic acid, octanoic acid, neodecanoic acid, decanoic acid, naphthenic acid, and benzoic acid.

In particular, in the case where an organic binder containing a phenol resin is used, it is favorable that a transition metal octylate or naphthenate is used as the organic acid salt of the transition metal. These have excellent compatibility with the phenol resin. Furthermore, in contrast to metal alcoholate, change over time of the phenol resin due to hydrolysis is less effected, and uniform mixing can be performed well. Moreover, inadequate formation and segregation of a carbon bond accompanying the change over time of the phenol resin are suppressed.

Furthermore, these salts have high metal contents in the salts, and it is not necessary to add an excessive transition metal organic acid salt in order to ensure a predetermined amount of metal, so that volatile components can be minimized. Consequently, a carbon bond after the heat treatment does not become porous, and high strength and high oxidation resistance can be exhibited.

In an aspect of the present invention, the above-described heat treatment can be performed in a reducing atmosphere or a non-oxidizing atmosphere. (Ninth aspect)

When the heat treatment is performed in a reducing atmosphere or a non-oxidizing atmosphere, the carbon residue in the carbon bond can be increased and the porosity can be controlled at a low level. Consequently, the strength of the refractory can be further increased, the modulus of elasticity can be reduced, and high thermal shock resistance can be exhibited.

In an aspect of the present invention, the transition metal, the transition metal salt, or the metal catalyst can be any one transition metal of Ni, Co, Fe, Ti, Zr, Cr, Mn, Cu, Pt, Rh, and Pd or a compound thereof. (Tenth aspect)

These metals and metal compounds exhibit high catalysis for facilitating the formation of carbon nanotubes (refer to Non-Patent Document 1). Fine catalyst allows crystals to rearrange in a heat treatment process of the carbon bond so as to form flexible textures including fine carbon fibers, e.g., carbon nanotubes. In the case where carbon based raw materials, e.g., carbon black and a graphite raw material, coexist, these raw materials function as fillers of the carbon bond including fine carbon fibers, so that the continuity of the carbon bond in the refractory textures is increased. As a result, an increase in strength, a reduction in modulus of elasticity, and a reduction in thermal expansion coefficient of the refractory are facilitated, and the thermal shock resistance is improved.

In particular, it is favorable that Ni, Co, Fe, or Cr is used from the view point of a high catalytic effect on a synthesis reaction of very fine carbon fiber-shaped textures, e.g., carbon nanotubes.

In the case where the transition metal salts are used, the transition metal salts, which do not effect change over time of the phenol resin due to hydrolysis, are used. Favorably usable transition metal salts include metal soaps (R)n-M(O), acetylacetone metal salts $(C_5H_7O_2)$n-M(O), octylic acid metal compounds, and naphthenic acid metal compounds. Here, M represents a metal, e.g., Ti, Zr, Cr, Ni, Co, Fe, Cu, Pt, Rh, or Pd, and R represents an alkyl group, e.g., methyl, ethyl, propyl, n-butyl, or phenyl. Furthermore, transition metal inorganic compounds, e.g., chlorides, sulfides, acetic acid compounds, phosphoric acid compounds, and the like of transition metals, can also be used in the form of a liquid. These transition metal inorganic compounds are in the form of being dissolved in water or organic solvents, e.g., alcohol or mineral oil, and are used as a liquid (metal solution).

In particular, it is preferable that a transition metal salt having good compatibility with the organic binder is selected appropriately in order that the transition metal salt can be mixed with the organic binder homogeneously. For example, in the case where a phenol resin is used as the organic binder, a transition metal salt, e.g., an octylic acid metal compound or a naphthenic acid metal compound, having the compatibility with the phenol resin is selected.

The transition metal or the like may be used as a metal colloid, a suspension of very fine metal oxide powder, or a metal sol. In this case, a colloidal solution or a suspension, in which nanosize fine particles (fine particles having particle diameters of 1,000 nm or less) of each of the above-described transition metals or salts thereof is dispersed in a solvent, is used.

As described above, the transition metal or the like (or metal catalyst) is used as a catalyst or the like in order to form very fine carbon fiber-shaped textures in the inside of the carbon bond and facilitate the reduction in modulus of elasticity of the carbon bond. Therefore, it is preferable that the amount of addition is minimized from the view point of maintenance of the high strength insofar as the above-described catalysis is ensured. In an aspect of the present invention, preferably, the amount of the transition metal or the like or the metal catalyst contained in the above-described carbon bond is 1.0 percent by weight or less (excluding 0 percent by weight) of the entire refractory. (Eleventh aspect)

If the amount of the transition metal or the like (or the metal catalyst) exceeds 1.0 percent by weight of the entire refractory, the oxidation catalysis of the metal is increased, and the strength, the oxidation resistance, and the corrosion resistance of the refractory tend to be degraded. In particular, unfavorably, the tendency of the carbon-containing refractory becomes significant.

It is more favorable that the amount of the transition metal or the like (or the metal catalyst) is specified to be 0.01 to 0.5 percent by weight of the entire refractory from the view point of optimum adjustment of adequate exhibition of catalysis and the like of the transition metal or the like (or the metal catalyst) and minimization of reduction in the strength, the oxidation resistance, and the corrosion resistance of the refractory.

This can be varied in accordance with the amount of carbon bond which varies depending on the type of refractory constituents, the ratio thereof, the particle size configuration and the like, and predetermined properties and the like.

Furthermore, an appropriate amount of metal fine powder of Al, B, Cr, Ti, Mg, Si, or the like, a non-oxide, e.g., $B_4C$, SiC, or BN, a glass component, or the like may be added separately as an oxidation resistance imparting agent. In this manner, the oxidation resistance of the refractory having a carbon bond can be improved and further highly durable refractory can be produced. In particular, with respect to the carbon-containing refractory containing the carbon based raw material, the oxidation resistance and the durability of carbon serving as the carbon based raw material are also improved pronouncedly.

Preferably, these metal fine powders, non-oxides, glass components, and the like serving as an oxidation resistance imparting agent are added within the range of 2 parts by weight or less in total relative to 100 parts by weight of the entire refractory excluding these additives. This is because if the agent exceeds 2 parts by weight, the possibility of breakage of the refractory texture by the thermal expansion of the metals and the like themselves tends to increase, the influence of reaction products and the like of the metals and the like and various constituents e.g., carbon, of the refractory exerted on the carbon bond texture is increased, and the properties of the carbon bond are varied significantly, for example, the modulus of elasticity is increased, so that the effect of the present invention is reduced.

The above-described oxidation resistance imparting agent may not be contained. However, it is preferable that about 0.5 parts by weight or more is added because the oxidation resistance may become inadequate.

In an aspect of the present invention, particles containing the refractory aggregate and the carbon based raw material are used as the above-described base material particles. (Twelfth aspect)

In such a refractory containing carbon based raw material (hereafter referred to as "carbon-containing refractory") as well, base material particles containing the refractory aggregate and the carbon based raw material are bonded to each other and mutually by the carbon bond. Furthermore, in the carbon-containing refractory, carbon fiber-shaped textures can strengthen the connection of the carbon based raw material, particularly the connection between the carbon based raw material and the refractory aggregate.

For the refractory aggregate, magnesia (MgO), alumina $(Al_2O_3)$, zirconia $(ZrO_2)$, spinel $(MgAl_2O_4)$, silica $(SiO_2)$, and the like and compounds thereof can be used alone or a plurality of them can be used in combination. Carbides, nitrides, and the like, e.g., silicon carbide (SiC) and silicon nitride ($Si_3N_4$), can also be used. The particle diameters of coarse particles of the refractory aggregate to be used are usually 0.001 to 1 mm. However, in the case where carbides, nitrides, and the like having a function of an antioxidant as well are used as the refractory aggregate, it is preferable that those having particle diameters of 0.01 mm or more are used in order to prevent breakage or the like of the refractory textures due to expansion, prevent a degradation in the corrosion resistance, and so on.

For the carbon based raw material, coarse particles of flaky graphite, earthy graphite, carbon black, smokeless coal, mesophase carbon, and the like can be used. Usually, the particle diameters of them to be used are 0.001 to 1 mm.

In the refractory containing the carbon based raw material according to an aspect of the present invention, with respect to the blending ratio of the refractory aggregate, the carbon based raw material, the organic binder, and the metal solution, it is preferable that the refractory aggregate is 99 to 45 parts by weight, the carbon based raw material is 1 to 55 parts by weight and, relative to them, the organic binder is 1.5 to 20 parts by weight in terms of solid content and the amount of metal in the metal solution is 0.01 to 1.0 parts by weight.

If the carbon based raw material exceeds 55 parts by weight, even when carbon fiber-shaped textures due to the transition metal or the like or the metal catalyst or the like according to an aspect of the present invention is included in the carbon bond, maintenance of the oxidation resistance and the like becomes difficult because the volume ratio of the carbon based raw material is increased. If the carbon based raw material is less than 1 part by weight, the refractory becomes equivalent to a refractory not containing carbon based raw material and, therefore, the properties, e.g., the thermal shock resistance and the corrosion resistance, as the carbon based raw material-containing refractory are not exhibited. If the solid content of the organic binder exceeds 20 parts by weight, even when carbon fiber-shaped textures due to the transition metal or the like or the metal catalyst or the like according to an aspect of the present invention is included in the carbon bond, maintenance of the oxidation resistance and the like becomes difficult because the volume ratio of the carbon based raw material is increased. If the solid content is less than 1.5 parts by weight, the carbon bond cannot perform the function as a bonding material. The amount of metal in the metal solution is as described above.

A method for manufacturing a refractory according to an aspect of the present invention is characterized by including a first step of kneading a starting material containing an organic binder composed of any one of a phenol resin, tar, or pitch or a mixture thereof in an arbitrary combination, a solution, and base material particles, the solution being a solution of a transition metal or a transition metal salt and being in a liquid state or a colloidal or suspension state in which fine particles having particle diameters of 1,000 nm or less are dispersed in a solvent and a second step of molding the kneaded product produced by the above-described first step and heat-treating the molded product. (Thirteenth aspect)

A method for manufacturing a refractory according to an aspect of the present invention is characterized by including a first step of kneading a starting material containing an organic binder composed of any one of a phenol resin, tar, or pitch or a mixture thereof in an arbitrary combination, a solution, and base material particles, the solution being a solution of a metal catalyst facilitating formation of fine fibers from carbon and being in a liquid state or a colloidal or suspension state in which fine particles having particle diameters of 1,000 nm or less are dispersed in a solvent and a second step of molding and heat-treating the kneaded product produced by the above-described first step. (Fourteenth aspect)

In a method for manufacturing a refractory according to an aspect of the present invention, the kneaded product produced by the above-described first step can be heat-treated in a reducing atmosphere or a non-oxidizing atmosphere in the above-described second step. (Fifteenth aspect) However, so-called light burned products and unburned products are not necessarily heat-treated in a reducing atmosphere or a non-oxidizing atmosphere.

According to these steps, (a) the refractory characterized in that carbon fiber-shaped textures having diameters of 50 nm or less are contained in the carbon bond (the first aspect) or (b) the refractory capable of obtaining a texture, in which fine particles (metal-containing nanoparticles) having particle diameters of 1,000 nm or less and containing a transition metal or the like (or a metal catalyst) are contained in the carbon bond while being dispersed and carbon fiber-shaped textures having diameters of 50 nm or less are present in the carbon bond while being dispersed by the heat received during preheating, steel receiving, or the like in the use, (the second aspect or the third aspect) can be produced.

That is, by these steps, a refractory can be produced, wherein degradation of the oxidation resistance, the corrosion resistance, and the like is suppressed, and high strength, low modulus of elasticity, low thermal expansion coefficient, and excellent thermal shock resistance are exhibited.

In the above-described first step, the following first kneading method and the second kneading method can be adopted selectively or in combination.

(First Kneading Method)

A mixture of starting raw materials of refractory constituents is blended separately with an organic binder composed of any one of a phenol resin, tar, or pitch or a mixture thereof in an arbitrary combination and a solution of a transition metal, a transition metal salt, a metal catalyst, or a metal catalyst, the solution being in a liquid state or a colloidal or suspension state in which fine particles having particle diameters of 1,000 nm or less are dispersed in a solvent and, thereafter, kneading is performed.

(Second Kneading Method)

A liquid prepared by mixing in advance the above-described organic binder and an organic metal compound solution having the compatibility with the organic binder is added to the mixture of starting raw materials of refractory constituents and, thereafter, kneading is performed.

The second kneading method is preferable in order to uniformly mix the metal solution and the organic binder with further improved dispersibility.

The molding method in the second step is not specifically limited in an aspect of the present invention. The molding may be performed by an appropriate method in accordance with the form and shape of the object product.

For the heat treatment in the second step, the following first heat treatment method and the second heat treatment method can be adopted.

(First heat treatment method) The molded product is heat-treated in a reducing atmosphere or a non-oxidizing atmosphere at about 600° C. to about 1,200° C.

(Second heat treatment method) The heat treatment is performed at a low temperature of about 600° C. or lower so as to produce a so-called light burned product or an unburned product.

In the first heat treatment method, carbon fiber-shaped textures can be produced during the heat treatment step. Since a suitable temperature range of the heat treatment temperature is different depending on the type of transition metal or the like (or metal catalyst), the temperature of the heat treatment is not specifically limited in the constituent features of the present invention. However, it is favorable that, for example, the heat treatment temperature is 600° C. to 800° C. for a Fe catalyst, and 600° C. to 1,200° C., more preferably 900° C. to 1,100° C. for a Ni catalyst from the view point of adequately effective exhibition of the catalysis of the metal.

When the second heat treatment is performed in a reducing atmosphere or a non-oxidizing atmosphere, the carbon residue in the carbon bond can be increased and the porosity can be controlled at a low level. Consequently, the strength of the carbon-containing refractory can be further increased, the modulus of elasticity can be further reduced, and higher thermal shock resistance can be exhibited. A carbon bond including fine carbon fiber textures can also be formed by using the heat received during use. In this case as well, a reducing atmosphere or a non-oxidizing atmosphere is preferable.

In the second heat treatment method, carbon fiber-shaped textures are hardly formed in the carbon bond, and textures, in which metal-containing nanoparticles having particle diameters of 1,000 nm or less are dispersed, are included.

In a method for manufacturing a refractory according to an aspect of the present invention, the above-described base material particles containing particles of a refractory aggregate and the carbon based raw material can be used. (Sixteenth Aspect)

A refractory raw material according to an aspect of the present invention is a refractory raw material, in which at least base material particles and an organic binder for forming a carbon bond in a hot state are mixed, characterized in that fine particles having particle diameters of 1,000 nm or less and containing a transition metal or a transition metal salt (metal-containing nanoparticles) are contained in the organic binder while being dispersed.

A refractory raw material according to an aspect of the present invention is a refractory raw material, in which at least base material particles and an organic binder for forming a carbon bond in a hot state are mixed, characterized in that fine particles having particle diameters of 1,000 nm or less and containing a metal catalyst facilitating formation of fine fibers from carbon are contained in the organic binder while being dispersed.

When this refractory raw material is used, the above-described refractory according to an aspect of the present invention can be produced.

In a refractory raw material according to an aspect of the present invention, the above-described base material particles containing particles of a refractory aggregate and the carbon based raw material can be used.

Advantages

As described above, in the refractory according to an aspect of the present invention, since metal-containing nanoparticles having particle diameters of 1,000 nm or less are contained in the inside of the carbon bond while being dispersed, degradation of the oxidation resistance, the corrosion resistance, and the like is suppressed and, in addition, an increase in strength, a reduction in modulus of elasticity, and a reduction in thermal expansion coefficient are facilitated. Furthermore, the abrasion resistance is also improved as the strength is increased. The content of the carbon based raw material, particularly graphite, which has been required previously to ensure predetermined thermal shock resistance, can be reduced. From this point of view as well, effects of improving the corrosion resistance, the abrasion resistance, the oxidation resistance, and the like are exerted. Consequently, a refractory having high thermal shock resistance can be provided.

BRIEF DESCRIPTION OF THE DRAWINGS

FIG. 5 (*b*) is a magnified diagram of the fiber-shaped carbon bond according to an embodiment of the present invention.

Figure 1:
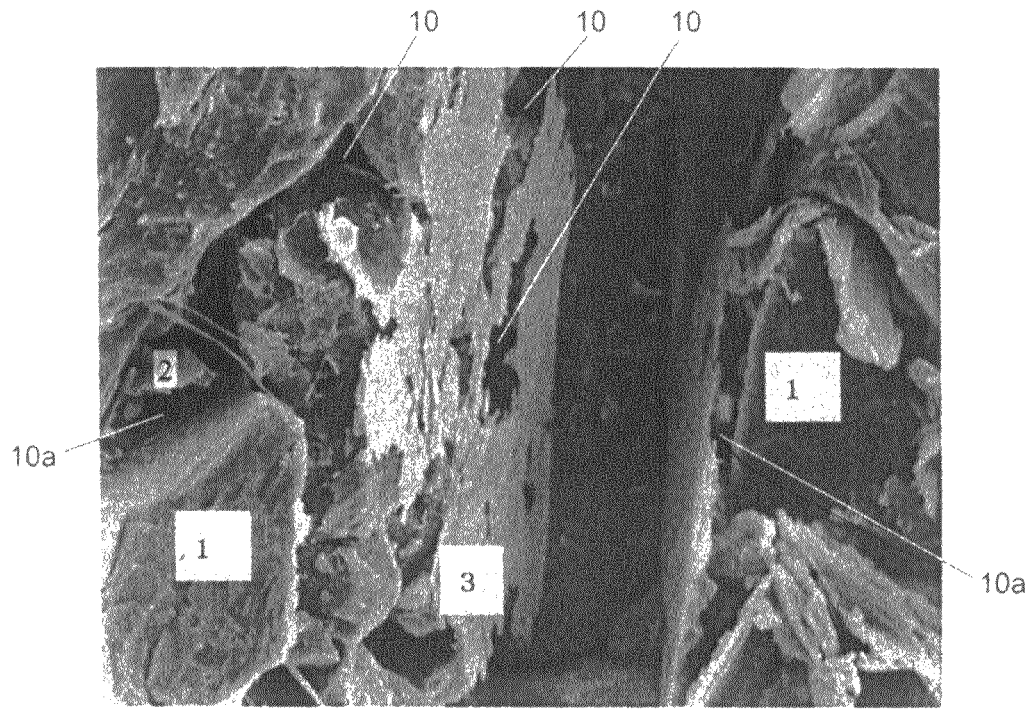
FIG. 1 is a diagram showing a texture of a refractory according to an embodiment of the present invention.

REFERENCE NUMERALS 1 coarse particle of refractory aggregate
2 carbonaceous coarse particle
3 carbon bond
4 metal-containing nanoparticle
6, 7 carbon fiber-shaped texture
10, 10*a* gap

BEST MODE FOR CARRYING OUT THE INVENTION

The best mode for carrying out the present invention will be described below.

A method for manufacturing a refractory according to an embodiment of the present invention will be described. For stating materials, coarse particles of a refractory aggregate, a carbon based raw material, and an organic binder, as well as a solution of a transition metal salt or a colloidal solution, in which nanoparticles of transition metal are dispersed in a solvent, (hereafter, the solution of a transition metal salt and the above-described colloidal solution are collectively referred to as "metal solution") are used.

For the coarse particles of refractory aggregate, magnesia ($MgO$), alumina ($Al_2O_3$), zirconia ($ZrO_2$), spinel ($MgAl_2O_4$), silica ($SiO_2$), and the like can be used alone or as compounds thereof. Carbides, nitrides, and the like, e.g., silicon carbide ($SiC$) and silicon nitride ($Si_3N_4$), can be used. The particle diameters of coarse particles of the refractory aggregate to be used are usually 0.001 to 1 mm.

For the carbon based raw material, coarse particles of flaky graphite, earthy graphite, and the like are used. The particle diameters of the coarse particles to be used are 0.001 to 1 mm.

For the organic binder, pitch, tar, a phenol resin, and the like, which exhibits a high carbon residue by being heat-treated, can be used.

For the transition metal to be used for the starting raw material, Ni, Co, Fe, Ti, Zr, Cr, Mn, Cu, Pt, Rh, or Pd can be used. In particular, it is favorable that Ni, Co, Fe, or Cr is used from the view point of a high catalytic effect on a synthesis reaction of very fine carbon fiber-shaped textures, e.g., carbon nanotubes.

In the case where the transition metal salts are used, the transition metal salts, which do not effect change over time of the phenol resin due to hydrolysis, are used. Favorably usable transition metal salts include metal soaps (R)n-M(O), acetylacetone metal salts ($C_5H_7O_2$)n-M(O), octylic acid metal compounds, and naphthenic acid metal compounds. Here, M represents a metal, e.g., Ti, Zr, Cr, Ni, Co, Fe, Cu, and Pt, and R represents an alkyl group, e.g., methyl, ethyl, propyl, n-butyl, or phenyl. Furthermore, transition metal inorganic compounds, e.g., chlorides, sulfides, acetic acid compounds, phosphoric acid compounds, and the like of transition metals, can also be used in the form of a liquid. These transition metal compounds are in the form of being dissolved in water or organic solvents, e.g., alcohol or mineral oil, and are used as a liquid (metal solution).

In particular, a transition metal salt having good compatibility with the organic binder is selected appropriately in order that the transition metal salt can be mixed with the organic binder homogeneously. For example, in the case where a phenol resin is used as the organic binder, a transition metal salt, e.g., an octylic acid metal compound or a naphthenic acid metal compound, having the compatibility with the phenol resin is selected.

The transition metal or the like may be used as a metal colloid, a suspension of very fine metal oxide powder, or a metal sol. In this case, a colloidal solution or a suspension is used, in which nanosize fine particles (fine particles having particle diameters of 1,000 nm or less) of each of the above-described transition metals or salts thereof is dispersed in a solvent.

An appropriate amount of metal fine powder of Al, B, Cr, Ti, Mg, or Si, a carbide powder, e.g., SiC or $B_4C$, or the like may be added separately as an oxidation resistance imparting agent.

With respect to the blending ratio of coarse particles of the refractory aggregate, the carbon based raw material, the organic binder, and the metal solution, the refractory aggregate particles are 99 to 45 parts by weight, the carbon based raw material is 1 to 55 parts by weight and, relative to them, the organic binder is 1.5 to 20 parts by weight in terms of solid content, and the amount of metal in the metal solution is 0.01 to 1.0 part by weight. In the case where the oxidation resistance imparting agent is added, a fine metal powder or a carbide powder is added within the range of 0.5 to 2 parts by weight.

In the first step, a predetermined amount of the metal solution is added to the liquid organic binder, e.g., phenol or pitch, followed by mixing adequately.

The above-described refractory aggregate coarse particles and the carbon based raw material coarse particles are added to a kneader, e.g., a fret mill, and a mixing treatment is performed. A predetermined amount of the mixed solution which has been mixed in the upstream step in the first step is added, and kneading is performed at a temperature range of ambient temperature to 150° C. for 5 to 20 minutes. In this manner, the metal solution is adequately kneaded into the inside of the organic binder, and the transition metal or the like is brought into the state of being mixed by dispersion as a solution or nanoparticles in the organic binder.

The resulting kneaded product is molded and heat-treated in a non-oxidizing atmosphere or a reducing atmosphere in the second step so as to produce a refractory of the present embodiment. This heat treatment is performed under optimum temperature and time for forming very fine carbon fiber-shaped textures in the carbon bond in accordance with the type of transition metal. For example, in the case where Fe is used as the transition metal, it is favorable that the heat treatment is performed at 600° C. to 800° C. for 30 to 120 minutes from the view point of facilitation of formation of very fine carbon fiber-shaped textures. In the case where Ni is used as the transition metal, it is favorable that the heat treatment is performed at 600° C. to 1,200° C., preferably at 900° C. to 1,100° C. for 30 to 120 minutes from the same viewpoint.

However, in practice, the time of heat treatment must be determined in consideration of denaturation of the organic binder and the carbon based raw material as well. For example, in the case where a phenol resin is used as the organic binder, since the temperature, at which volatile components of the phenol resin are removed and a product is stabilized, is 800° C. or higher, the heat treatment temperature must be 800° C. or more.

Figure 2:
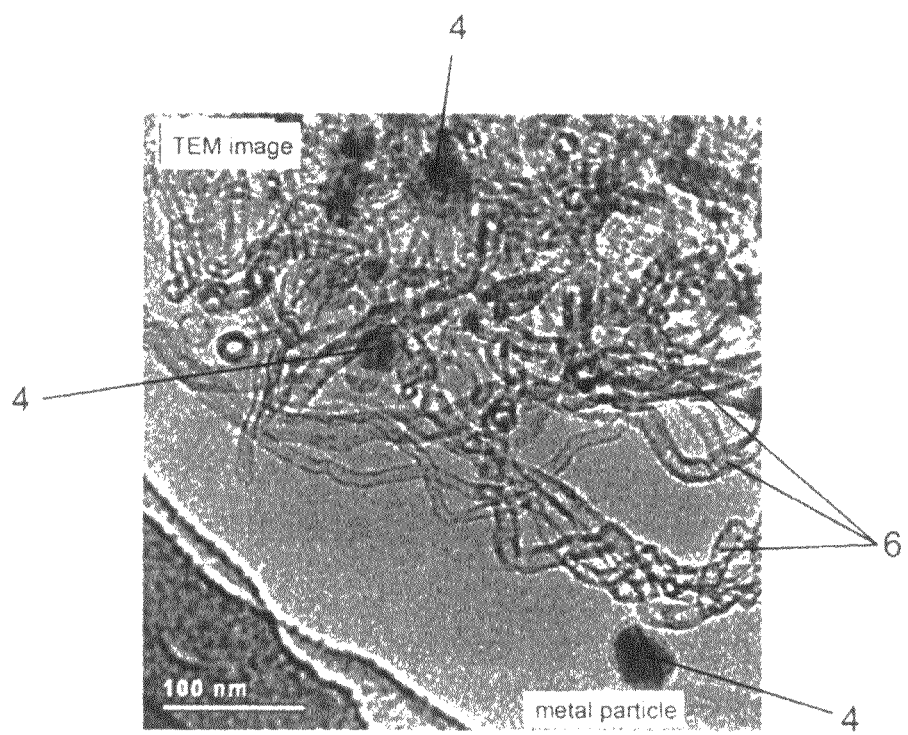
FIG. 2 is a magnified diagram of the carbon bond shown in FIG. 1.
Figure 3:
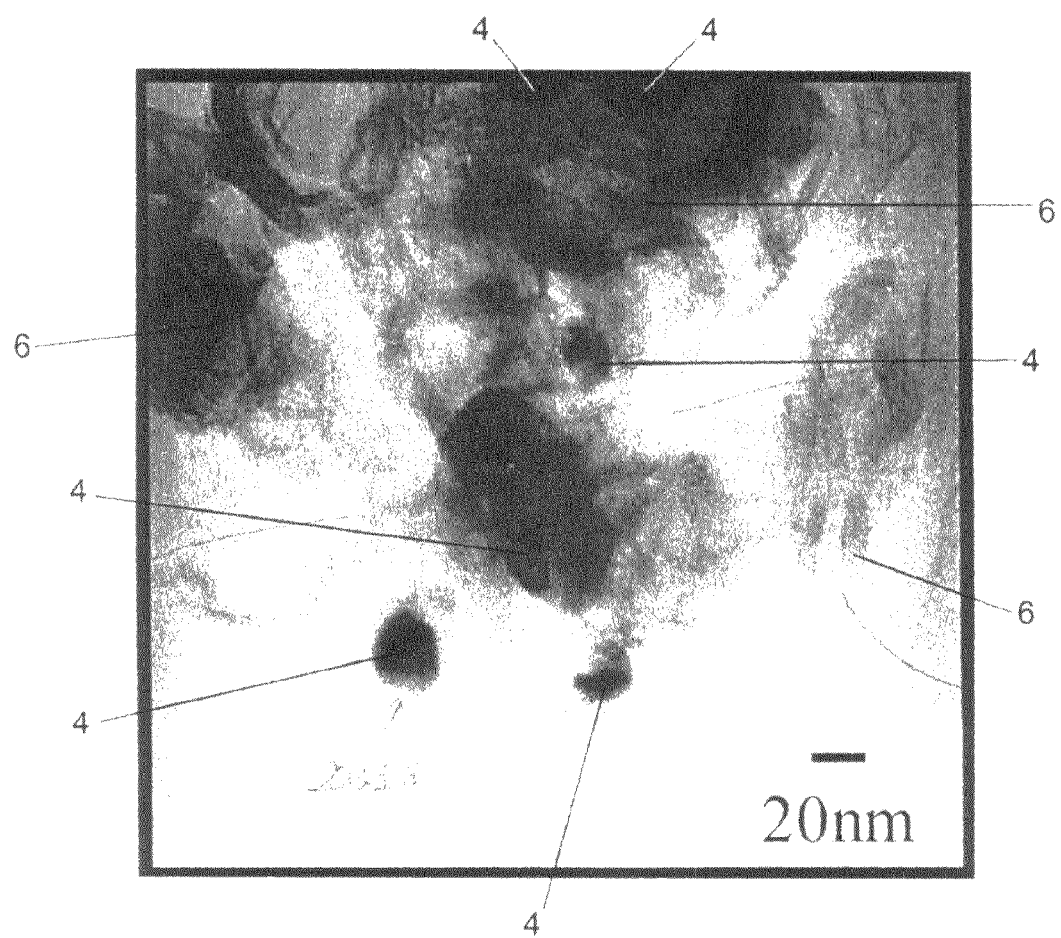
FIG. 3 is a further magnified diagram of the carbon bond shown in FIG. 2.
Figure 4:
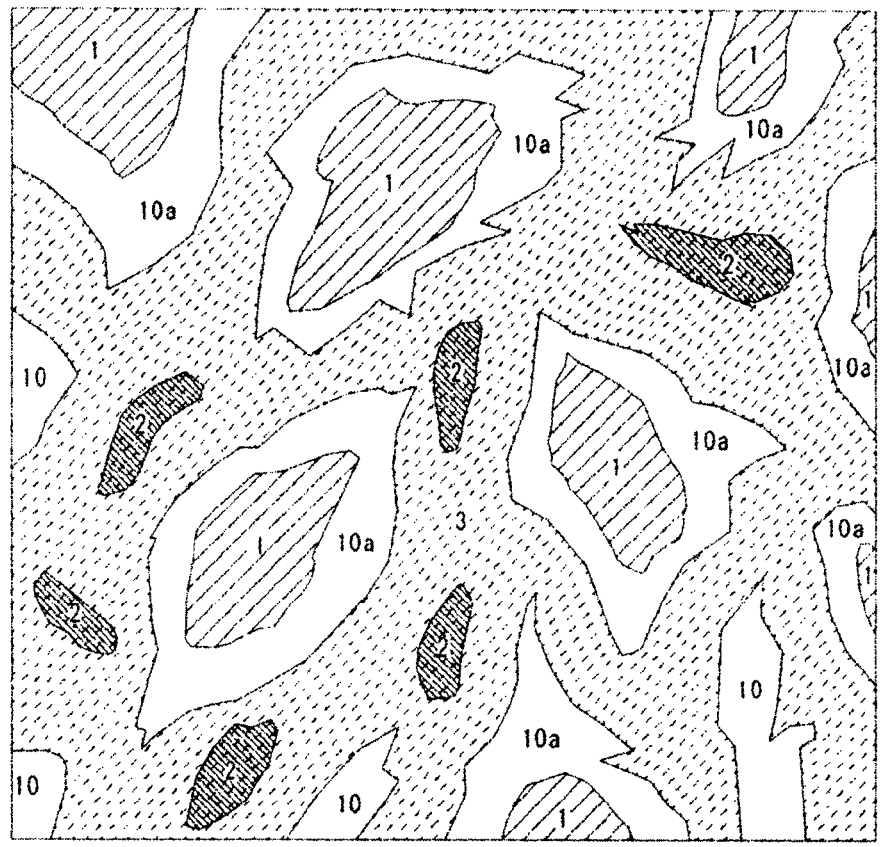
FIG. 4 is a schematic diagram for explaining the internal structure of the carbon bond in a refractory according to an embodiment of the present invention.

The refractory produced as described above has a texture structure as shown in FIG. 1 to FIG. 4. FIG. 1 shows a SEM photograph of the entire texture of the refractory. FIG. 2 and FIG. 3 show magnified SEM photographs of a part of the carbon bond shown in FIG. 1. FIG. 4 is an easy-to-understand schematic diagram showing the texture structure of the refractory as shown in FIG. 1. In FIG. 1 to FIG. 4, the texture of the refractory is composed of refractory aggregate coarse particles 1, carbonaceous coarse particles 2 formed from a carbon based raw material, a carbon bond 3 formed by carbonization of an organic binder, and metal-containing nanoparticles 4 dispersed uniformly in the inside of the carbon bond 3 (FIG. 1 shows the case where an oxidation resistance imparting agent is not added). The metal-containing nanoparticles 4 are transition metal particles deposited from the metal solution through vaporization of the volatile components during the heat treatment. Many gaps 10 formed by removing the volatile components in the starting raw material are present in the inside of the texture.

In general, since the connectivity between the refractory aggregate coarse particle 1 and the carbon bond 3 is poor, a very narrow gap 10a is formed around the refractory aggregate coarse particle 1. That is, in general, the thermal expansion coefficient of the refractory aggregate coarse particle 1 is larger than that of the carbon bond 3. Therefore, the refractory aggregate coarse particle 1 expanded during the heat treatment shrinks during cooling, so that the gap 10a is formed between the carbon bond 3 and the refractory aggregate coarse particle 1. Consequently, the refractory has a configuration in which the refractory aggregate coarse particle 1 is stored in a cavity formed in a three-dimensionally extended network skeleton of the carbon bond 3, the cavity being slightly larger than the refractory aggregate coarse particle 1. On the other hand, since the thermal expansion coefficient of the carbonaceous coarse particle 2 is nearly equal to that of the carbon bond 3, a gap is hard to occur between the carbonaceous coarse particle 2 and the carbon bond 3. Since both the carbonaceous coarse particle 2 and the carbon bond 3 are composed of carbon, they can be chemically bonded to each other easily.

With respect to the carbon in the carbon bond 3, many very fine carbon fiber-shaped textures 6 having particle diameters of about 20 nm are observed around the metal-containing nanoparticles 4 (in FIG. 3, complicatedly intertwining fiber-shaped substances like thin shadows are observed around the metal-containing nanoparticles 4, and these are very fine carbon fiber-shaped textures 6).

In the inside of the carbon bond 3, as shown in FIG. 3, it is estimated that very fine carbon fiber-shaped textures 6 with nanosize gaps are formed in the carbon bond 3 through catalysis and the like of the metal-containing nanoparticles 4. It is believed that the formation of the carbon fiber-shaped textures 6 allow the carbon-containing carbide to have properties of high-strength and low modulus of elasticity because the properties of the carbon bond 3 having a three-dimensional bond with the carbonaceous coarse particles 2 serving as fillers are varied.

In such a configuration, the thermal expansion coefficient of the refractory in a hot state is primarily dominated by the thermal expansion coefficient of the carbon bond 3. The reason for this is believed that since the gap 10a is formed around the refractory aggregate coarse particle 1, the expansion pressure of the refractory aggregate coarse particle 1 is hard to transfer to the skeleton of the carbon bond 3, and is hard to contribute to the thermal expansion coefficient of the refractory. On the other hand, as described above, many very fine carbon fiber-shaped textures 6 are formed in the inside of the carbon bond 3. It is estimated that these very fine carbon fiber-shaped textures 6 have a configuration in which carbon atoms are arranged regularly as in a carbon nanotube, and it is believed that the bonding strength between carbon atoms is higher than that in a glassy (amorphous) carbon texture. Therefore, it is believed that the thermal expansion coefficient of the carbon bond 3 is far smaller than that of a known amorphous carbon bond. Consequently, the thermal expansion coefficient of the entire refractory becomes small.

Figure 5:
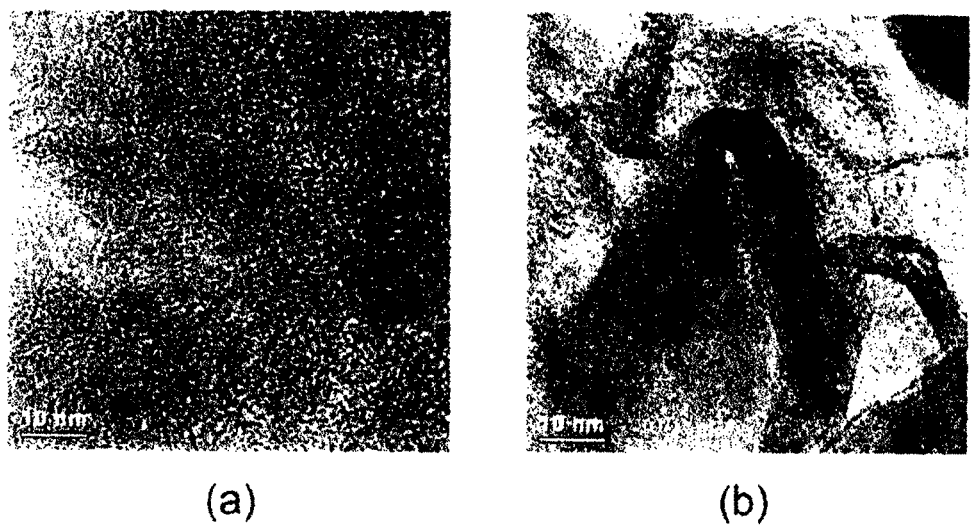
FIG. 5 (*a*) is a magnified diagram of a general amorphous carbon bond.

FIG. 5 shows a SEM photograph of a texture obtained in a test in which a phenol resin is heat-treated by using a transition metal catalyst in a reducing atmosphere. FIG. 5(a) shows a texture in which the transition metal catalyst is not present. FIG. 5(b) shows a texture in which the transition metal catalyst is present. With respect to the heat treatment condition of both cases, a heat treatment was performed in an $Al_2O_3$ crucible at 250° C. and, thereafter, a heat treatment was performed on a crucible basis in coke breeze at 1,500° C. for 3 hours.

The texture when the transition metal catalyst is not present (FIG. 5(a)) is so-called a glassy (amorphous) texture in which the surface is homogeneous and smooth, whereas the texture when the transition metal catalyst is present (FIG. 5(b)) is a strip-shaped or fine fiber-shaped texture, in which carbon nanotubes having diameters of about 20 nm are formed.

As a result, degradation of the oxidation resistance, the corrosion resistance, and the like is suppressed, and the refractory exhibiting high strength, a low modulus of elasticity, and a low thermal expansion coefficient is produced. Furthermore, the refractory exhibiting extremely excellent abrasion resistance and thermal shock resistance is produced.

Further specific examples of the refractory according to the present invention will be described below.

Examples

The experimental data of Examples and Comparative examples of the refractory according to the present invention are shown in (Table 1) to (Table 5). The three-point bending strength S is a measurement value at ambient temperature, and the kinetic modulus of elasticity is a measurement value at ambient temperature by a sound velocity method.

Examples of application of the present invention to a high-carbon content system are shown in (Table 1) to (Table 3). In these experiments, a raw material was prepared by blending 75 percent by weight of alumina serving as a refractory aggregate and 25 percent by weight of graphite serving as a carbon based aggregate, and formulations were prepared by adding 7 percent by weight of phenol resin, in terms of solid content relative to the above-described raw material, to the raw material. These formulations were molded my CIP (cold isostatic pressing) and, thereafter, a heat treatment was performed at 1,000° C. so as to produce carbon-containing refractories. The state of a bonding carbon (that is, carbon bond) portion after the heat treatment was observed with a transmission electron microscope (TEM). A metal solution shown in Example was added to the liquid phenol resin in advance and was used after being mixed adequately.

Examples of application of the present invention to a low-carbon content system are shown in (Table 4) and (Table 5). In these experiments, a raw material was prepared by blending 98 percent by weight of alumina serving as a refractory aggregate and 2 percent by weight of graphite or carbon black serving as a carbon based aggregate, and formulations were prepared by adding 2 percent by weight of phenol resin, in terms of solid content relative to the above-described raw material, to the raw material. These formulations were molded by friction press and, thereafter, a heat treatment was performed at 1,000° C. so as to produce carbon-containing refractories. A metal solution shown in Example was added to the liquid phenol resin in advance and was used after being mixed adequately.

TABLE 1

|  | Comparative example 1 | Example 1 | Example 2 | Example 3 | Comparative example 2 |
| --- | --- | --- | --- | --- | --- |
| Refractory aggregate (alumina) | 75 | 75 | 75 | 75 | 75 |
| Carbon based raw material (graphite) | 25 | 25 | 25 | 25 | 25 |
| Carbon based raw material (carbon black) | — | — | — | — | — |
| Phenol resin (solid content excluding solvent) | +7 | +7 | +7 | +7 | +7 |
| Tar, pitch, and the like | — | — | — | — | — |
| Transition metal powder (Fe2O3) |  |  |  |  |  |
| Powder (in terms of Fe) 100 to 500 μm | — | — | — | — | — |
| Fine powder (in terms of Fe) 1 to 100 μm | — | — | — | — | — |
| Very fine powder (in terms of Fe) <1 μm | — | — | — | — | — |
| Iron ethylhexanoate solution (in terms of Fe) | — | +0.01 | +0.1 | +1.0 | +1.5 |
| Cobalt sulfamate solution (in terms of Co) | — | — | — | — | — |
| Metal nickel colloidal solution (in terms of Ni) | — | — | — | — | — |
| Metal alcoholate (in terms of Cr) | — | — | — | — | — |
| Bonding carbon property (after heating at 1000° C.) |  |  |  |  |  |
| Carbon fiber-shaped texture | None | Present | Present | Present | Present |
| (A: amorphous, CF: fiber-shaped) | A | CF | CF | CF | CF |

TABLE 1-continued

|  | Comparative example 1 | Example 1 | Example 2 | Example 3 | Comparative example 2 |
|---|---|---|---|---|---|
| Quality after firing (firing at 1000° C.) | | | | | |
| Bending strength S MPa | 7.0 | 8.4 | 8.6 | 8.7 | 8.8 |
| Kinetic elasticity E GPa | 11.6 | 11.0 | 10.8 | 10.5 | 10.5 |
| Thermal expansion coefficient α at 1500° C. % | 0.67 | 0.61 | 0.57 | 0.55 | 0.54 |
| Thermal shock resistance index S/Eα | 100 | 139 | 154 | 167 | 172 |
| Corrosion resistance index (the higher the stronger) | 100 | 104 | 103 | 97 | 65 |
| General evaluation | — | ○ | ○ | ○ | x |

○: good,
Δ: no change,
x: degraded performance

TABLE 2

|  | Example 4 | Comparative example 4 | Comparative example 5 |
|---|---|---|---|
| Refractory aggregate (alumina) | 75 | 75 | 75 |
| Carbon based raw material (graphite) | 25 | 25 | 25 |
| Carbon based raw material (carbon black) | — | — | — |
| Phenol resin (solid content excluding solvent) | +7 | +7 | +7 |
| Tar, pitch, and the like | — | — | — |
| Transition metal powder (Fe2O3) | | | |
| Powder (in terms of Fe) 100 to 500 μm | — | — | +0.5 |
| Fine powder (in terms of Fe) 1 to 100 μm | — | +0.5 | — |
| Very fine powder (in terms of Fe) <1 μm | +0.5 | — | — |
| Iron ethylhexanoate solution (in terms of Fe) | — | — | — |
| Cobalt sulfamate solution (in terms of Co) | — | — | — |
| Metal nickel colloidal solution (in terms of Ni) | — | — | — |
| Metal alcoholate (in terms of Cr) | — | — | — |
| Bonding carbon property (after heating at 1000° C.) | | | |
| Carbon fiber-shaped texture | Present | Slightly present | None |
| (A: amorphous, CF: fiber-shaped) | CF | Almost A | A |
| Quality after firing (firing at 1000° C.) | | | |
| Bending strength S MPa | 8.1 | 7.1 | 7.1 |
| Kinetic elasticity E GPa | 11.1 | 11.4 | 11.6 |
| Thermal expansion coefficient α at 1500° C. % | 0.62 | 0.66 | 0.67 |
| Thermal shock resistance index S/Eα | 131 | 105 | 101 |
| Corrosion resistance index (the higher the stronger) | 98 | 98 | 98 |
| General evaluation | ○ | Δ | x |

○: good,
Δ: no change,
x: degraded performance

TABLE 3

|  | Example 5 | Example 6 | Example 7 | Example 8 |
|---|---|---|---|---|
| Refractory aggregate (alumina) | 75 | 75 | 75 | 75 |
| Carbon based raw material (graphite) | 25 | 25 | 25 | 25 |
| Carbon based raw material (carbon black) | — | — | — | — |
| Phenol resin (solid content excluding solvent) | +7 | +7 | +7 | +7 |
| Tar, pitch, and the like | — | — | — | +3.5 |
| Transition metal powder (Fe2O3) | | | | |
| Powder (in terms of Fe) 100 to 500 μm | — | — | — | — |
| Fine powder (in terms of Fe) 1 to 100 μm | — | — | — | — |
| Very fine powder (in terms of Fe) <1 μm | — | — | — | — |
| Iron ethylhexanoate solution (in terms of Fe) | — | — | — | +0.1 |
| Cobalt sulfamate solution (in terms of Co) | +0.1 | — | — | — |
| Metal nickel colloidal solution (in terms of Ni) | — | +0.1 | — | — |
| Metal alcoholate (in terms of Cr) | — | — | +0.1 | — |
| Bonding carbon property (after heating at 1000° C.) | | | | |
| Carbon fiber-shaped texture | Present | Present | Present | Present |
| (A: amorphous, CF: fiber-shaped) | CF | CF | CF | CF |

TABLE 3-continued

|  | Example 5 | Example 6 | Example 7 | Example 8 |
|---|---|---|---|---|
| Quality after firing (firing at 1000° C.) | | | | |
| Bending strength S MPa | 8.7 | 9.6 | 7.8 | 9.5 |
| Kinetic elasticity E GPa | 10.6 | 9.8 | 11.2 | 9.6 |
| Thermal expansion coefficient α at 1500° C. % | 0.57 | 0.52 | 0.64 | 0.51 |
| Thermal shock resistance index S/Eα | 160 | 209 | 121 | 215 |
| Corrosion resistance index (the higher the stronger) | 102 | 98 | 108 | 95 |
| General evaluation | ○ | ○ | ○ | ○ |

○: good,
Δ: no change,
x: degraded performance

TABLE 4

|  | Comparative example 6 | Comparative example 7 | Example 9 | Example 10 |
|---|---|---|---|---|
| Refractory aggregate (alumina) | 98 | 98 | 98 | 98 |
| Carbon based raw material (graphite) | 2 | — | 2 | — |
| Carbon based raw material (carbon black) | — | 2 | — | 2 |
| Phenol resin (solid content excluding solvent) | +3 | +3 | +3 | +3 |
| Tar, pitch, and the like | — | — | — | — |
| Metal powder (Si alloy) | — | — | — | — |
| Metal powder (Si—Al alloy) | — | — | — | — |
| Transition metal powder (Fe2O3) | | | | |
| Powder (in terms of Fe) 100 to 500 μm | — | — | — | — |
| Fine powder (in terms of Fe) 1 to 100 μm | — | — | — | — |
| Very fine powder (in terms of Fe) <1 μm | — | — | — | — |
| Iron ethylhexanoate solution (in terms of Fe) | — | — | +0.1 | +1.0 |
| Cobalt sulfamate solution (in terms of Co) | — | — | — | — |
| Metal nickel colloidal solution (in terms of Ni) | — | — | — | — |
| Metal alcoholate (in terms of Cr) | — | — | — | — |
| Chloroplatinic acid solution (in terms of Pt) | — | — | — | — |
| Palladium chloride solution (in terms of Pd) | — | — | — | — |
| Zirconium chloride solution (in terms of Zr) | — | — | — | — |
| Very fine Ti powder (<1 μm) | — | — | — | — |
| Bonding carbon property (after heating at 1000° C.) | | | | |
| Carbon fiber-shaped texture (A: amorphous, CF: fiber-shaped) | None A | None A | Present CF | Present CF |
| Quality after firing (firing at 1000° C.) | | | | |
| Bending strength S MPa | 5.9 | 6.2 | 7.9 | 8.3 |
| Kinetic elasticity E GPa | 18.0 | 21.0 | 14.0 | 15.6 |
| Thermal expansion coefficient α at 1500° C. % | 0.80 | 0.82 | 0.70 | 0.72 |
| Thermal shock resistance index S/Eα | 45 | 40 | 90 | 82 |
| Corrosion resistance index (the higher the stronger) | 245 | 235 | 255 | 242 |
| General evaluation | — | — | ○ | ○ |

○: good,
Δ: no change,
x: degraded performance

TABLE 5

|  | Comparative example 8 | Example 11 | Example 12 | Example 13 | Example 14 | Example 15 | Example 16 |
|---|---|---|---|---|---|---|---|
| Refractory aggregate (alumina) | 98 | 98 | 98 | 98 | 98 | 98 | 98 |
| Carbon based raw material (graphite) | — | — | — | — | — | — | — |
| Carbon based raw material (carbon black) | 2 | 2 | 2 | 2 | 2 | 2 | 2 |
| Phenol resin (solid content excluding solvent) | +3 | +3 | +3 | +3 | +3 | +3 | +3 |
| Tar, pitch, and the like | — | — | — | — | — | — | — |
| Metal powder (Si alloy) | +2 | +2 | — | — | — | — | — |
| Metal powder (Si—Al alloy) | — | — | +2 | — | — | — | — |
| Transition metal powder (Fe2O3) | | | | | | | |
| Powder (in terms of Fe) 100 to 500 μm | — | — | — | — | — | — | — |
| Fine powder (in terms of Fe) 1 to 100 μm | — | — | — | — | — | — | — |
| Very fine powder (in terms of Fe) <1 μm | — | — | — | — | — | — | — |
| Iron ethylhexanoate solution (in terms of Fe) | — | — | — | — | — | — | — |

TABLE 5-continued

|  | Comparative example 8 | Example 11 | Example 12 | Example 13 | Example 14 | Example 15 | Example 16 |
|---|---|---|---|---|---|---|---|
| Cobalt sulfamate solution (in terms of Co) | — | — | — | — | — | — | — |
| Metal nickel colloidal solution (in terms of Ni) | — | +0.2 | +0.2 | — | — | — | — |
| Metal alcoholate (in terms of Cr) | — | — | — | — | — | — | — |
| Chloroplatinic acid solution (in terms of Pt) | — | — | — | +0.1 | — | — | — |
| Palladium chloride solution (in terms of Pd) | — | — | — | — | +0.1 | — | — |
| Zirconium chloride solution (in terms of Zr) | — | — | — | — | — | +0.1 | — |
| Very fine Ti powder (<1 μm) | — | — | — | — | — | — | +0.1 |
| Bonding carbon property (after heating at 1000° C.) |  |  |  |  |  |  |  |
| Carbon fiber-shaped texture (A: amorphous, CF: fiber-shaped) | None A | Present CF | Present CF | Present CF | Present CF | Present CF | Present CF |
| Quality after firing (firing at 1000° C.) |  |  |  |  |  |  |  |
| Bending strength S MPa | 12.0 | 22.0 | 25.0 | 7.7 | 7.9 | 7.6 | 8.0 |
| Kinetic elasticity E GPa | 36.5 | 39.0 | 45.0 | 13.1 | 13.8 | 14.0 | 13.5 |
| Thermal expansion coefficient α at 1500° C. % | 0.84 | 0.83 | 0.87 | 0.71 | 0.72 | 0.70 | 0.70 |
| Thermal shock resistance index S/Eα | 43 | 75 | 71 | 92 | 88 | 86 | 94 |
| Corrosion resistance index (the higher the stronger) | 210 | 208 | 220 | 241 | 240 | 238 | 234 |
| General evaluation | — | ○ | ○ | ○ | ○ | ○ | ○ |

○: good,
Δ: no change,
x: degraded performance

Comparative example 1 shows an example in which the metal solution is not added. As a result of the observation, the bonding carbon portion was amorphous.

In Example 1 to Example 3, an iron ethylhexanoate solution was used as the metal solution so as to add a metal within the range of 0.01 to 1.0 percent by weight in terms of a metal portion, and an influence exerted on the properties was examined. As a result of TEM observation, carbon fiber-shaped textures having the size of diameter of 20 to 50 nm were observed in the bonding carbon portions of all samples. In particular, many carbon fiber-shaped textures were observed in Example 2 and Example 3.

With respect to the quality, when the amount of addition of metal iron was within the range of 0.01 to 1.0 percent by weight, the corrosion resistance was not very degraded, the strength was increased, and the modulus of elasticity and the thermal expansion were reduced. As a result, an improvement in thermal shock resistance was observed. On the other hand, in Comparative example 2 in which metal iron was added up to 1.5 percent by weight, the thermal shock resistance was improved, but the corrosion resistance was degraded significantly.

In Example 4 and Comparative examples 4 and 5, the amount of addition of metal was controlled at a constant value, and an influence of the particle size was examined. In an addition method, the transition metal powder was added to a phenol resin while being suspended in a solvent in advance, followed by mixing adequately. When the particle diameter was 1 μm or less, many carbon fiber-shaped textures having diameters of 20 to 50 nm were observed in the bonding carbon portions. However, in Comparative examples 4 and 5, carbon fiber-shaped textures become not observed as the particle diameter was increased, and as a result, an improvement was not observed in the properties.

Examples 5 to 7 show examples in which the type of transition metal was changed. Many carbon fiber-shaped textures having diameters of about 20 to 50 nm were observed in all bonding carbon. In particular, in Example 6, many carbon fiber-shaped textures were able to be observed. With respect to the properties, each of the phenomena of an increase in strength, a reduction in modulus of elasticity, and a reduction in expansion was observed, and Example 6 was particularly pronounced.

In Example 8, a phenol resin and tar, pitch, or the like were used in combination, and 0.1 percent by weight of metal solution in terms of a metal portion was added. Many carbon fiber-shaped textures having diameters of about 20 to 50 nm were observed in the bonding carbon portions. With respect to the properties as well, the phenomena of an increase in strength, a reduction in modulus of elasticity, and a reduction in expansion were further facilitated and improved. Therefore, it was made clear that the use of the tar or pitch in combination was also effective.

In Comparative example 6, graphite was used as the carbon based raw material, and in Comparative example 7, carbon black was used as the carbon based raw material. In both cases, since the amount of carbon based raw material was small and about 2 percent by weight, features of low strength, high modulus of elasticity, and high expansion were exhibited. On the other hand, Example 9 and Example 10 corresponded to Comparative examples 6 and 7, except that 0.1 percent by weight of iron ethylhexanoate was added as a Fe component, and an increase in strength, a reduction in modulus of elasticity, and a reduction in thermal expansion coefficient were recognized. Therefore, an adequate improvement effect was ensured even in a low carbon content region.

Example 11 is an example in which a Si powder was added in order to impart strength. Example 12 is an example in which a Si—Al based alloy powder was added in order to impart strength. The resulting systems were blended with 0.2 percent by weight, in terms of Ni, of a metal Ni colloidal solution, and it was ascertained that effects of suppressing an increase in kinetic modulus of elasticity and increasing the strength were exerted as compared with those in Comparative example 8. Example 13 to Example 16 show the results of the same examination when the types of metal were Pt, Pd, Ti, and Zr. With respect to these types of metal, it was also ascertained that the effects of increasing the strength, reducing the kinetic modulus of elasticity, and reducing the thermal expansion coefficient were exerted.

Furthermore, materials of Comparative example 1 and Example 8 were used, and molding was performed by CIP with a predetermined rubber mold, followed by drying-firing-working, so that Ladle shroud (outer diameter φ180× inner diameter φ105× length 1,100 mL) were produced. A molten steel casting test was performed by using the resulting nozzle without preheating. With respect to Comparative example 1, cracking due to a thermal stress occurred in the first casting. However, with respect to Example 8, cracking did not occur after 10 cycles of casting was performed without preheating and, therefore, excellent thermal shock resistance was ascertained.

INDUSTRIAL APPLICABILITY

The present invention can be used in the refractory manufacturing industry, the refractory being used in an iron making process, a steelmaking process, and the like.

The invention claimed is:

1. A refractory, in which a carbon bond is disposed between base material particles, produced by kneading a starting material containing an organic binder composed of any one of a phenol resin, tar, or pitch or a mixture thereof in an arbitrary combination, a solution or dispersion liquid of a transition metal or a transition metal salt, and alumina refractory aggregate particles and carbon based raw material which are base material particles, the solution or dispersion liquid being in a liquid state or a colloidal or suspension state in which fine particles having particle diameters of 1,000 nm or less are dispersed in a solvent, molding the kneaded product and heat-treating the molded product in a reducing atmosphere or a non-oxidizing atmosphere at 600° C. to 1,200° C.,
characterized in that the refractory aggregate particles are 99 to 45 parts by weight, the carbon based raw material is 1 to 55 parts by weight and, relative to them, the organic binder is 1.5 to 20 parts by weight in terms of solid content and the amount of metal in the solution or dispersion liquid is 0.01 to 1.0 parts by weight and
characterized in that carbon fiber-shaped textures having diameters of 50 nm or less are contained and fine particles having particle diameters of 1,000 nm or less and containing a transition metal or a transition metal salt are dispersed in the carbon bond.

2. The refractory according to claim 1, characterized in that metal-containing nanoparticles deposited in the carbon fiber-shaped textures by mixing and heat-treating a starting material prepared by adding a solution or dispersion liquid of a transition metal or a transition metal salt to the base material particles and an organic binder are contained in the carbon bond, the solution or dispersion liquid being in a liquid state or a colloidal or suspension state in which fine particles having particle diameters of 1,000 nm or less are dispersed in a solvent.

3. The refractory according to claim 1, characterized in that the transition metal or the transition metal salt is any one transition metal of Ni, Co, Fe, Ti, Zr, Cr, Mn, Cu, Pt, Rh, and Pd or a compound thereof.

* * * * *